Sept. 27, 1932. G. E. MIRFIELD 1,879,399
INDEXING MEANS FOR GRINDING MILLING CUTTERS
Filed Jan. 25, 1930 2 Sheets-Sheet 1
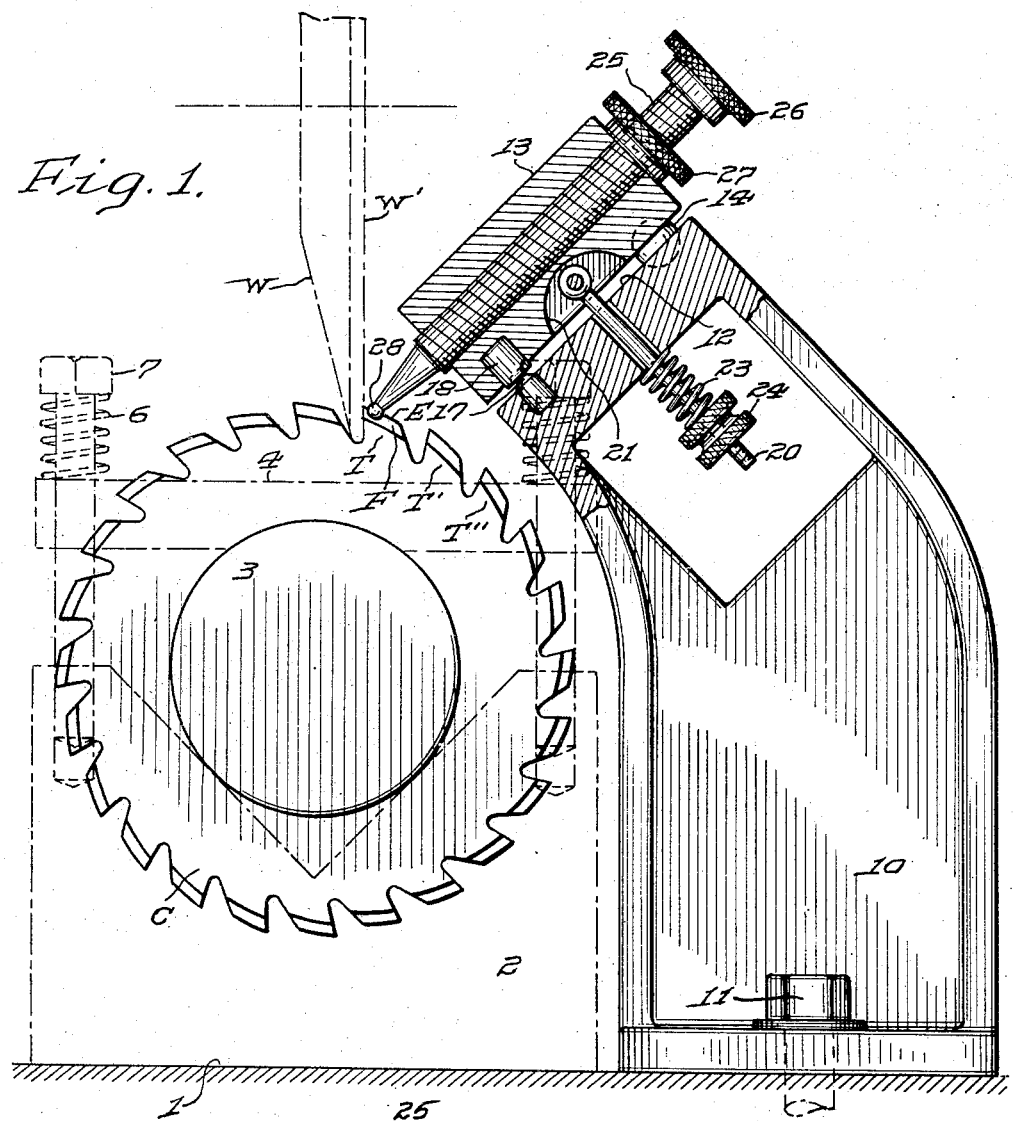
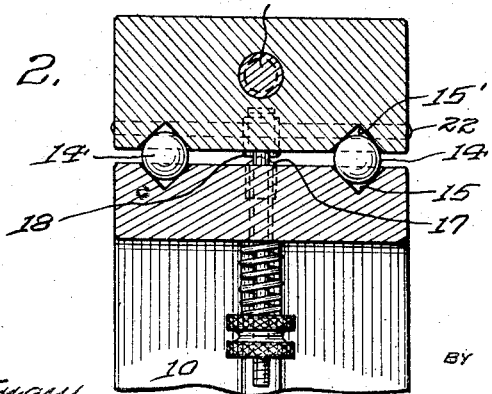
WITNESS
F. J. Hartman
INVENTOR
George E. Mirfield.
BY
ATTORNEYS Sept. 27, 1932.   G. E. MIRFIELD   1,879,399
INDEXING MEANS FOR GRINDING MILLING CUTTERS
Filed Jan. 25, 1930   2 Sheets-Sheet 2
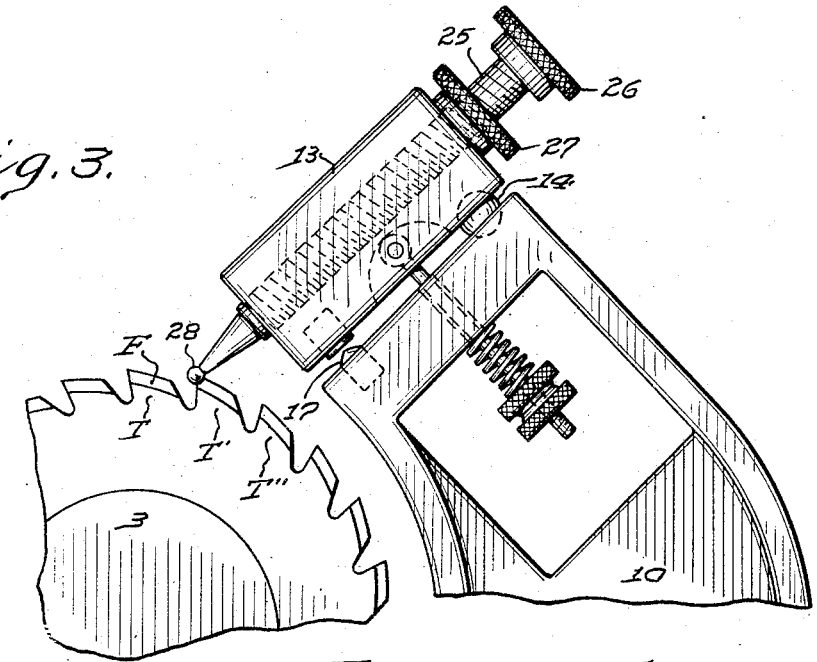
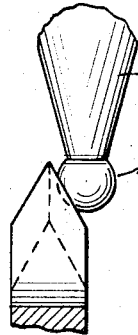
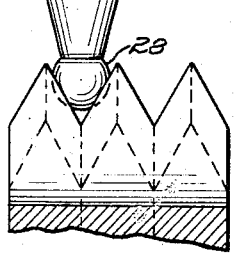
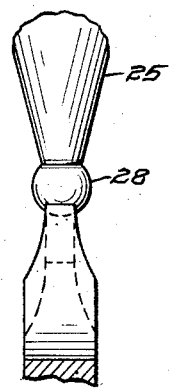
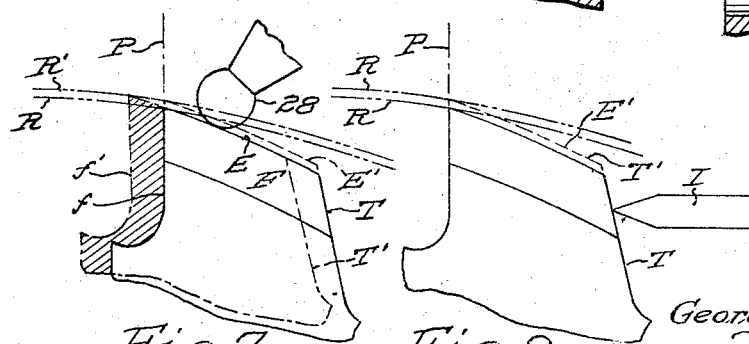
INVENTOR
George E. Mirfield.
ATTORNEYS Patented Sept. 27, 1932

1,879,399

UNITED STATES PATENT OFFICE

GEORGE E. MIRFIELD, OF YOUNGSTOWN, OHIO

INDEXING MEANS FOR GRINDING MILLING CUTTERS

Application filed January 25, 1930. Serial No. 423,320.

My invention relates particularly to a novel method of and improved means for grinding and resharpening milling cutters or hobs and is especially directed to securing more nearly perfect circumferential alignment of the cutting edges of the several teeth of a milling cutter than has hitherto been considered possible in commercial practice.

In the manufacture of milling cutters or hobs, the cutters are first formed to shape, then hardened, and lastly ground. As it is virtually impossible to secure absolutely perfect uniformity in the heating of the cutters and in the subsequent quenching incident to the hardening operation and for other reasons, the cutters often become slightly warped or misshapen during manufacture, and as the method heretofore employed for thereafter grinding the cutter is ineffective to bring it back to proper form, it frequently happens that when the cutter is completed and ready for use, the cutting edges of the teeth are slightly out of true in that the radial distances therefrom to the axis of the cutter are somewhat unequal. This condition results in rendering the shorter teeth, that is, those whose cutting edges are less remote from the axis of revolution of the cutter, less effective in removing the metal from the work than the longer teeth, with consequent production of imperfections in the work as well as diminution of the amount of metal which can be removed per unit of time with a given feed and cutting speed. Additionally, the life of the cutter is reduced through the necessity of more frequent regrinding than should normally be required, for the longer teeth, because obliged to remove an undue amount of metal from the work, become dull more rapidly than where the duty of removing a given amount of metal is evenly distributed among all of the teeth, and since at each grind an appreciable amount of metal has to be removed from each tooth the effective life of the cutter is thus correspondingly lessened.

In the case of commercial milling cutters, and more particularly thread milling cutters, manufactured by modern methods and skillful workmen, the variations in the distances of the cutting edges of the several teeth from the center of the cutter are sufficient to make the cutters run, on the average from .003" to .0075" out of true, and it has heretofore been considered impractical to materially decrease these variations under commercial conditions; in accordance with the present invention, however, I am able to initially grind or to resharpen milling cutters under commercial conditions with such a degree of accuracy that the differences in the distances between the center of the cutter and the cutting edges of several teeth will not vary more than .0005", an amount so small that for all practical purposes the cutter may be considered as running substantially theoretically true.

It has heretofore been the practice to sharpen and resharpen the teeth of milling cutters by means of a grinding machine having a disk grinding wheel and an index finger suitably mounted to engage the back faces of the several teeth successively as they are brought into position for grinding, so that after the front face of one tooth is ground off the required degree to properly sharpen it, the succeeding teeth are correspondingly indexed in grinding position with the aid of the index finger by engaging it with the back face of each tooth and then ground off to an extent such that the distance between the back face and the front or cutting face of each tooth is exactly the same as that of the first tooth ground. However, as in this method of indexing the radial distance to the cutting edge of any tooth is no way determinative of the position in which that particular tooth is set in the grinding machine or of the extent to which it is ground, any initial inequalities in the radial distances to the cutting edges of the several teeth remain substantially the same after grinding, and thus are perpetuated and preserved throughout the life of the cutter irrespective of the number of times it may be resharpened.

In accordance with the present invention, however, the extent to which each tooth is to be ground is determined in conformity with the radial distance of the cutting edge of such tooth from the cutter axis, so that each tooth is ground to exact extent required to bring its cutting edge to the same radial distance from the axis of the cutter as the edge of every other tooth. I am thus able to grind or re-grind the cutter with extreme accuracy with resulting corresponding enhancement of the accuracy and perfection of the work, and prolongation of the life of the cutter.

Among the objects and purposes of my invention, therefore, is to provide a method of grinding milling cutters by means of which the cutter teeth may be consecutively ground in such manner and to such extent as to insure more nearly perfect concentricity of rotation of the cutting edges of the cutter than has heretofore been considered commercially possible.

A further object of the invention is to provide a method of grinding milling cutters whereby the extent to which each tooth is ground is determined by the radial distance of the outer face or edge of such tooth from the axis of the cutter instead of by the distance between the front and back faces of the tooth as has been the practice heretofore.

A still further object of my invention is to provide means adapted for use in the performance of my improved method of grinding milling cutters and which are in themselves of novel form and suitable for employment in connection with the usual types of grinders utilized for grinding milling cutters, said means comprising automatically operative indexing mechanism adapted to engage the faces or peripheral edges of the several cutter teeth as they are successively brought toward grinding position, and to index and thereafter hold each tooth therein during the grinding operation in such manner that exactly the proper amount of metal will be removed to bring the extremity of the tooth to a predetermined distance from the cutter axis.

My invention further includes other objects, advantages, steps and operations, and novel features of design, construction and arrangement hereinafter more specifically mentioned or which will be apparent to those skilled in the art from the disclosure thereof as herein embodied.

While under most conditions I prefer to utilize in the performance of my improved method of grinding cutters, mechanism of the character of that herein described and claimed, as by means thereof I am enabled to obtain extremely satisfactory results, I do not in any way desire or intend to restrict myself to the employment of such mechanism in the carrying out of the method, as in lieu of the said mechanism any other mechanisms, means or instrumentalities suitable therefor may be availed of if desired.

In the accompanying drawings, Fig. 1 is an end view, partly in vertical section, of a preferred embodiment of the indexing mechanism which forms a part of my invention in association with a thread milling cutter of usual form rotatably mounted for grinding; Fig. 2 is a fragmentary section on the line 2—2 in Fig. 1; Fig. 3 is an end elevation of a portion of the structure shown in Fig. 1 but illustrating the parts in a position assumed thereby during one of the movements of the cutter incident to bringing a fresh tooth into grinding position; Figs. 4, 5 and 6 are fragmentary views on a very much enlarged scale of certain portions of milling cutters of various forms and respectively showing the preferred manner in which a single point thread cutter, a multiple point thread cutter, and a gear or form cutter are indexed for grinding, and Figs. 7 and 8 are respectively fragmentary views on the same scale of single teeth of a thread milling cutter of substantially the same type as that shown in Fig. 1 and designed to illustrate the manner in which inequalities in the length of the cutter teeth are removed in accordance with my improved method of grinding and retained by the method hitherto generally employed. The same characters of reference are used to designate like parts in the several figures.

In the performance of my invention the cutter C which is to be ground, and which may be of any usual form, a threading cutter being shown in the drawings for convenience of illustration, is rotatably supported in a grinding machine which may be of any preferred type and may desirably comprise the usual slide 1 supporting a pair of V-blocks 2 which in turn support an arbor 3 on which the cutter is disposed so as to lie between the V-blocks, against which the arbor is held by a cross bar 4 disposed above each block and bearing on the top of the arbor, springs 6 surrounding bolts 7 extending through the ends of the cross bars and into the subjacent blocks serving to urge the arbor downwardly against the blocks. The grinding machine is also provided with a grinding wheel W (which in Fig. 1 is shown in the position assumed with relation to the cutter and other parts when the grinding of the face of the adjacent tooth T is completed), and in accordance with the usual practice, the plane of the grinding face W' of the wheel is disposed parallel to the axis of the cutter and is rearwardly offset from the plane of its vertical diameter in order that the wheel will so shape each tooth that the latter will have the proper rake when operating on the work. The several parts of the grinding machine to which reference has just been made are shown in broken lines in Fig. 1 of the drawings and, as they are commonly found in like or equivalent forms in grinding machines suitable for grinding milling cutters, require no further description.

The indexing mechanism proper comprises a pedestal 10 secured to the slide 1 of the grinding machine in any convenient way as by the bolts 11, the pedestal desirably comprising a vertically extending web having marginal flanges or ribs and, at its upper extremity, a table 12 for supporting the index head 13, the face of the table being inclined to the vertical preferably at an angle of about 45°. The index head is disposed upon a three point support comprising a pair of laterally spaced balls 14 respectively seating in oppositely disposed conical depressions 15, 15' in the juxtaposed yet spaced-apart surfaces of the table and the head, and a point 17 recessed in the table and extending above the face thereof for engagement with the opposed face of a stud 18 seated in the head. For yieldingly holding the head upon its said three supports, I provide a bolt 20 having an eye at its upper end which is housed in a depression 21 in the under face of the head and pivotally secured therein by a transversely extending pin 22 seated in the head. This bolt extends downwardly and rearwardly through a hole in the table to receive at its opposite end a compression spring 23 and adjusting nut 24. The bolt, spring and nut thus cooperate to yieldingly draw the head toward the table and maintain it upon its supports, but permit the head to be rotated about the balls 14, so as to slightly separate the stud 18 from the point 17 as and when required, the head of course returning to normal position under the influence of the spring whenever the lifting force is released. I prefer to form the point and stud of hardened steel, as thereby I am enabled to virtually eliminate wear of these parts and thus to obtain extreme accuracy in the positioning of the index head and insure that it shall be returned exactly to its original position each time it has been displaced therefrom. I also prefer to position the balls and the point 17 substantially at the vertices of an isosceles triangle with the base of the triangle, that is, the line between the centers of the balls, substantially parallel to the axis of the cutter and its apex, which is formed by the point 17, directed generally toward the cutter; the bolt 20 then is journaled substantially at the mid-point of the triangle.

Threaded into the index head 13 I provide an index screw 25 having a knurled head 26 to facilitate the positioning of the screw with respect to the index head, a knurled lock nut 27 being provided for holding the screw in adjusted position; at its opposite or inner end the screw is pointed and preferably provided with a ball point 28 desirably of hardened steel to minimize wear. This ball 28 is adapted to engage the cutter tooth T which is to be ground either on its peripheral cutting edge or, preferably, particularly when thread milling cutters are concerned, upon one of the beveled faces F, of the tooth lying adjacent its peripheral cutting edge E which is, of course, formed by the intersection of the said faces, the engagement of the ball point with the tooth being effected relatively near the operative plane of the grinding wheel as hereinafter more fully explained.

In the performance of my improved method of grinding with the aid of the mechanism just described, it will be assumed that one cutter tooth T of the threading cutter is first properly ground to standard form by suitable manipulation of the grinding machine in the ordinary way, whereby at the conclusion of this operation it will occupy the relative position with respect to the grinding wheel shown in Fig. 1. The index screw 25 is then adjusted in the index head while the latter rests on its three point support until the ball point 28 bears preferably on one of the beveled side faces F of the tooth at a point very close to the grinding face W' of the wheel, and the index screw is then locked by the lock nut 27, thereby bringing the parts to the position shown in Fig. 1. By suitable manipulation of the slide and table (not shown) of the grinding machine, the cutter is then moved relatively to the wheel so as to clear the latter from the path of the teeth, and the cutter is then rotated either manually or by mechanism (not shown) in a counterclockwise direction when viewed as in Fig. 1 so as to advance the succeeding tooth T' somewhat past normal grinding position. During this movement of the cutter, the point of tooth T' engages the ball point 28 of the index screw and lifts the index screw and head from their normal position substantially as shown in Fig. 3, the head during this movement turning on the balls 14; as the rotation of the cutter is continued, the ball point 28 under the influence of the spring 23 follows the face F of the tooth which, however, because it gradually falls away rearwardly, ultimately clears the ball, whereupon the head resumes its normal position. Thereupon, the counter-clockwise rotation of the cutter is arrested and the cutter then turned in the opposite or clockwise direction until the face F of the tooth re-engages the ball point 28, thus arresting further clockwise rotation of the cutter and positively locating the tooth T' in grinding position. The slide and table of the grinding machine are then manipulated so as to bring grinding face W' of the wheel across the front face of the tooth T' so as to grind the same in the ordinary way, after which the cutter is again disengaged from the wheel and the same series of operations repeated with respect to the tooth T'', and so on until all of the teeth of the cutter have been ground.

From the foregoing it will be observed that each tooth is located in grinding position when the engagement of its face F with the ballpoint 28 prevents further clockwise rotation of the cutter, and as the ball point 28 when the index head 13 is resting on its supports is always located at the same distance from the axis of rotation of the cutter, it follows that enough metal will be removed by the grinding wheel from the front face of each tooth to bring the outer extremity of its cutting edge (which is formed by the intersection of the faces F—F) at exactly or substantially exactly the same distance from the center of the cutter as the corresponding point on the standard tooth.

Theoretically, the greatest exactitude in indexing in accordance with my improved method should be obtained by locating the tooth through engagement of its peripheral edge with the ball point 28 instead of one of its faces F, but I have found in practice that when grinding either single point or multiple point thread-cutters and the like, it is usually preferably to index from one of the said faces, as any slight errors or irregularities which may occur therein are apt to be cumulative in their effect on the contour of the peripheral edge formed by the intersection of the faces while, additionally, the edge of the cutter is more apt to become untrue or distorted from wear or abrasion than are the said faces; consequently, in the case of threading cutters and the like having sharp or relatively sharp peripheral edges, more accurate results can generally be obtained by indexing from the faces of the teeth than from their edges, but of course either method may be used as preferred, and it will therefore be understood that by the term "periphery" as employed in the claims hereof I intend to designate and include not only the edge or face at the peripheral extremity of each cutter tooth but also the beveled faces or surfaces F lying adjacent and on opposite sides thereof.

In Figs. 4 and 5, I have shown the preferred manner of indexing the teeth of threading cutters, the teeth and ball point of the indexing screw being of course greatly enlarged in these views, while in Fig. 6 I have shown the preferred method of indexing a gear or form cutter which has no sharp peripheral edge, and thus may be satisfactorily indexed from its outer periphery or face. As Figs. 4, 5 and 6 are front elevations of the teeth therein respectively shown, portions of ball point 28 appear in dotted lines, as the backing off of the teeth results in each tooth falling away rapidly from its front face and thus, although the points of engagement of the teeth with the balls are relatively near the front faces of the former, they are still somewhat below the highest points of the teeth when viewed as in the said figures.

Figs. 7 and 8 are respectively designed to show the improved results attained by grinding a tooth in accordance with my method as compared to the results attained by the methods of grinding heretofore practiced and in which each tooth is indexed in grinding position from its rear face. It will be understood, of course, that in the average cutter the variations in the radial distance of the cutting edges of the several teeth from the center of the cutter are usually but a very few thousandths of an inch, and it has therefore been necessary to exaggerate such variations greatly in the said figures in order to demonstrate clearly the manner in which I have overcome the disadvantages arising from the methods of grinding heretofore practiced.

Thus, in Fig. 7 I have shown in full lines a single tooth T which may be considered as a standard or ideal tooth; it will be noted that the forward extremity of its cutting edge E lies in the arc of a circle R whose center is at the axis of rotation of the cutter and thus represents the proper path for the extremities of all of the teeth when the cutter is rotated on its axis; the ball point 28 of the index screw is shown in indexing position, but for the sake of clearness in engagement with the peripheral edge of the tooth rather than with its side beveled face F, and the tooth and ball may thus be considered as in the relative position assumed after the tooth T has been ground. Let us now assume that the succeeding tooth T' is slightly longer than the standard tooth T; the outer extremity of its peripheral edge E' would thus lie in an arc R' of correspondingly greater radius than the arc R, and if it were superimposed on the tooth T its peripheral edge would assume the dotted line position E'. Now when a tooth of this character is indexed in accordance with my invention, the ball point 28 will engage the tooth to arrest its clockwise rotation at a point behind, that is, nearer the rear face of the tooth, that at which the ball would engage a standard tooth, whereby the longer tooth will be positioned for grinding with its front face $f'$ considerably in advance of the position in which the front face of a standard tooth would be disposed. Consequently, as the grinding wheel always removes all of the tooth metal which lies in advance of the plane P with which the face $f$ of the standard tooth coincides after grinding, the entire shaded portion of the tooth T' would, under these conditions, be removed, thereby bringing the outer extremity of its peripheral edge into coincidence with the corresponding extremity of the standard tooth T (assuming the two teeth were superimposed as shown) or, in other words, into the arc R. It will of course be noted that the ultimate form of the tooth T' after grinding (as indicated in broken lines) is somewhat different from its previous form, principally in that the distance between its front and rear faces has been considerably shortened over the corresponding distance in the standard tooth T or in the non-standard tooth T' before grinding. But this is of relatively little importance as compared to the desirability of obtaining substantially perfect radial symmetry of the extremities of the cutting edges of several teeth of the cutter.

In Fig. 8 I have shown the standard tooth T indexed in grinding position in the customary way, that is, by an index finger I bearing on the rear face of the tooth, and I have also shown superposed on the tooth T and in dotted lines a slightly longer tooth T', the extremity of whose peripheral edge before grinding thus lies in the arc R'. As shown by this figure, when a high tooth, such as T', is thus indexed from its rear face, its front face will be ground down to the plane P which lies the same distance from the point of the index finger I as the front face of the standard tooth, with the result that after the tooth has been ground its cutting edge E' still lies beyond the radius R which marks the path of the extremity of the standard tooth and is thus still out of circumferential alignment with the latter, so that the error previously existing in the irregular tooth still persists irrespective of how many times it may be reground.

In accordance with my improved method, however, as the indexing means, such as the ball point 28, is always the same distance from the axis of the cutter when the several teeth are respectively in grinding position, and as the final cutting plane P of the grinding wheel is always the same with respect to the indexing means when in this position, the grinding of each tooth always proceeds to exactly the same point with respect to said means, and it is therefore apparent that after grinding, the extremity of the cuting edge of each tooth will lie in or substantially in the arc R and thus at the same distance from the axis of the cutter.

While I have hereinabove more particularly described the practice of my method of grinding with the aid of the apparatus herein disclosed, it will be understood that the former may readily be carried out with the aid of other means and instrumentalities if preferred while, furthermore, if desired, changes and modifications may be made both in the performance of the method itself, irrespective of the particular means which may be availed for its performance and/or in the apparatus I have herein disclosed as suitable therefor, without departing from the spirit and scope of the invention as defined in the appended claims.

Having thus described my invention, I claim and desire to protect by Letters Patent of the United States:

1. The combination with a cutter grinding machine comprising means for rotatably supporting the cutter to be ground and a grinding wheel for grinding the cutter teeth, of indexing mechanism including a pointer adapted for limited movement in a plane normal to the axis of a cutter supported by said means, means for positively limiting the movement of the pointer in one direction with respect to the plane of the wheel, and means for yieldingly resisting movement of the pointer in the opposite direction, said pointer being adapted by engagement with the peripheries of the cutter teeth when at the limit of its movement in the first mentioned direction to successively maintain the teeth in grinding position.

2. The combination with a grinding machine comprising means for rotatably supporting a cutter to be ground and a wheel for grinding the cutter teeth, of means adapted to engage the periphery of each tooth to index said tooth in grinding position, means for supporting the first mentioned means for limited oscillatory movement in a plane normal to the axis of the cutter, means for positively limiting said movement in one direction and means for yieldingly maintaining said supporting means in engagement with said limiting means.

3. The combination with a grinding machine comprising means for rotatably supporting a cutter to be ground and a wheel for grinding the cutter teeth, of a pointer adapted to successively index said teeth in grinding position by engagement with their respective peripheries, means for positively maintaining said pointer in indexing position but adapted to permit the pointer to be moved therefrom in one direction so that the teeth may be carried past the pointer as the cutter is rotated and yielding means operative to move the pointer towards indexing position whenever it is out of engagement with the peripheral surface of one of the teeth.

4. The combination with a grinding machine comprising means for rotatably supporting a cutter to be ground and a wheel for grinding the cutter teeth, of a pointer adapted to successively index said teeth in grinding position by engagement with their respective peripheries, and means for yieldingly maintaining said pointer in indexing position but adapted to permit the pointer to be moved therefrom to permit the teeth to be carried past the pointer as the cutter is rotated to successively bring the teeth to grinding position, said means being operative to return the pointer to indexing position after each tooth is moved out of engagement therewith.

5. The combination with a cutter grinding machine comprising means for rotatably supporting the cutter to be ground, of an index pointer, means for supporting the pointer in a position to successively contact the peripheries of the several teeth slightly behind their front faces to thereby index each tooth in grinding position and yielding means operative to return the pointer to indexing position after its displacement therefrom through rotation of the cutter.

6. The combination with a cutter grinding machine comprising means for rotatably supporting the cutter to be ground, of an index pointer adapted for limited oscillatory movement in a plane normal to the axis of the cutter and yielding means operative to urge the pointer to a position to successively contact the peripheries of the several cutter teeth slightly behind their front faces to thereby maintain each tooth in grinding position.

7. The combination with a cutter grinding machine adapted to rotatably support a milling cutter and comprising a grinding wheel operative to grind the cutter in a predetermined plane parallel to the axis of rotation thereof, of an index pointer adapted to engage the peripheries of the several teeth when in grinding position, means for supporting said pointer, and yielding means for normally maintaining said pointer in predetermined position with respect to said supporting means but operative upon rotation of the cutter in one direction to permit the pointer to move away from said supporting means to allow the cutter teeth to be successively moved past grinding position.

8. The combination with a cutter grinding machine adapted to rotatably support a milling cutter and comprising a grinding wheel operative to grind the cutter in a predetermined plane parallel to the axis of rotation thereof, of an index pointer adapted to engage the peripheries of the several teeth when in grinding position, means for supporting said pointer, means for limiting the movement of the pointer in one direction and yielding means for normally maintaining said pointer at the limit of said movement but operative upon rotation of the cutter in one direction to permit the pointer to move in a plane normal to the cutter axis and away from said supporting means to allow the cutter teeth to be successively moved past grinding position and to return the pointer to normal position when the teeth successively pass out of engagement therewith whereby the pointer becomes effective after reengagement with the adjacent tooth to prevent rotation of the cutter in reverse direction.

In witness whereof I have hereunto set my hand this 10th day of January, 1930.

GEORGE E. MIRFIELD.